Figure 1:
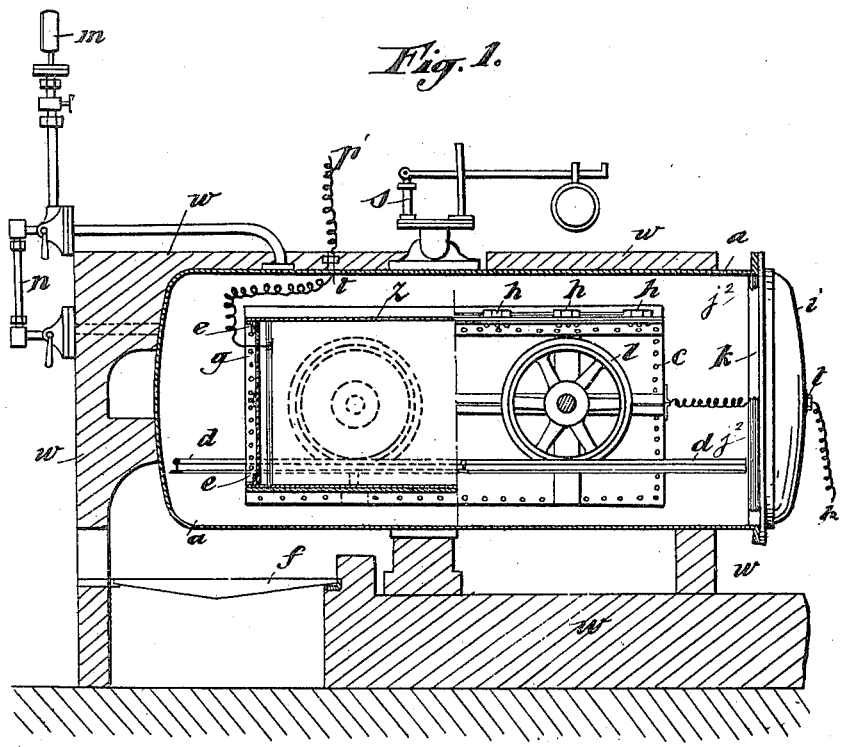

No. 661,443. Patented Nov. 6, 1900.
E. COULON.
PROCESS OF PRODUCING ARTIFICIAL STONE.
(Application filed Mar. 20, 1899.)

(No Model.)  3 Sheets—Sheet 1.

WITNESSES
George M. Richards
G. M. Lamasure

INVENTOR
Emery Coulon
by Wm. H. Babcock
Attorney

THE NORRIS PETERS CO., PHOTO-LITHO., WASHINGTON, D. C.

No. 661,443. Patented Nov. 6, 1900.
E. COULON.
PROCESS OF PRODUCING ARTIFICIAL STONE.
(Application filed Mar. 20, 1899.)
(No Model.) 3 Sheets—Sheet 3.

WITNESSES
INVENTOR

United States Patent Office.

EMERY COULON, OF BLATON, BELGIUM.

PROCESS OF PRODUCING ARTIFICIAL STONE.

SPECIFICATION forming part of Letters Patent No. 661,443, dated November 6, 1900.

Application filed March 20, 1899. Serial No. 709,798. (No specimens.)

*To all whom it may concern:*

Be it known that I, EMERY COULON, a citizen of the Kingdom of Belgium, residing at Blaton, Belgium, have invented a certain new and useful Process of Producing Artificial Stone, of which the following is a specification.

Hitherto artificial stone has been produced by mixing either dry or moistened sand and lime in suitable proportions and submitting said mixture to the action of steam or hot water for a varying period of time—generally sixty to seventy-two hours—with the result of obtaining conglomerated products of coarse texture, more or less high resistance, and more or less perfect homogeneity, the fracture of which does not at all resemble that of natural stone. Therefore a great many trials have been made without practical result for the market, and artificial stone could not be generally employed as a substitute for other materials in construction, owing to the great expense of manufacture, due to several imperfect processes by means of which incomplete results only could be obtained.

The object of my present invention is to provide a new process by means of which artificial stone may be produced in the best practical industrial conditions, the structure and formation of the artificial stone produced being similar to the geological structure of natural stone and having all the qualities of the latter.

The invention therefore involves, first, the special preparation of raw materials, and, second, the petrifaction of such materials.

In producing artificial stone the object is not to produce an ordinary conglomerated mixture of sand and lime, but to obtain a most perfect silicate of lime. To produce the best results, the ingredients must be in a sufficiently-divided state to allow of a perfect contact between the materials, and the mixture of the latter must be most thorough. The latter condition is much the more important, as two materials—sand and lime—of very different densities and having a tendency to separate during manipulation are employed for producing artificial stone.

Primarily my improved process consists in mixing sand and lime in the desired proportions and submitting the mixture to perfect crushing within the same apparatus, whereby I obtain an impalpable and well-mixed homogeneous material, which is then compressed laterally in other apparatus for producing artificial stone. The crushing as aforesaid produces fineness of grain. The compression produces a close grain in the stone. The mixture being thus impalpable and perfect, the product obtained after the manufacture represents silicate in nearly pure state. The grain of the stone produced will be uniform, and the stone will have a very fine fracture and be sharp-edged, like natural sandstone. The impalpable raw materials settling more perfectly in the molds produce hard and dense stone, which qualities are always required for building materials. The inner walls of the molds allow inward horizontal pressure at all points of their height and on every side, the side walls being inwardly movable, as hereinafter described. The molds containing the mixture being introduced into the furnaces are immersed in water raised to a minimum heat of 140° to 150° Celsius during six hours at least, in accordance with the product to be obtained. The inward pressure thus applied to the movable walls of the mold compresses the block of material therein at the same time that it is subjected to steam and electro-chemical action. At the same time an electric current is passed through the moistened mass for the purpose of promoting chemical action. The molds are then withdrawn from the furnace and the mass dried and cooled, thus producing artificial stone resembling natural stone and being of perfect homogeneity and uniform structure.

My artificial stone cannot be injured or caused to deteriorate by the hardest frost or any inclemency of seasons. On the contrary, it has been proved that the resistance thereof will be readily increased by the action of air. The improved stone being perfectly homogeneous, it may be easily cut and is much more suitable for ornamental work than the best natural stone. As said artificial stone may be colored as desired by admixing any suitable coloring-matter, it may be employed for producing agreeable effects in such ornamental work.

The effect of the electric current will be readily understood, since there are two substances adapted to combine to produce a fixed compound or silicate of lime, and the combination of such substances may be effected under the best conditions. The chemical reaction may be represented as follows:

$$CaO + SiO_2 + 2H_2O = Ca(OH)_2 + H_2SiO_3 = CaSiO_3 + 2H_2O.$$

It will be understood that the action of the electric current is to increase affinity of the substances under treatment to produce ready and perfect petrifaction, and it will be noted that my improved process is important, in fact, because it requires a comparatively weak mixture of lime or cement and sand, which mixture under the aforementioned treatment will set in a very short time.

In the accompanying drawings I have shown a suitable apparatus for carrying out the above-described process of producing artificial stone.

Figure 2:
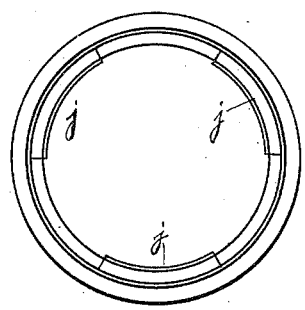
Figure 3:
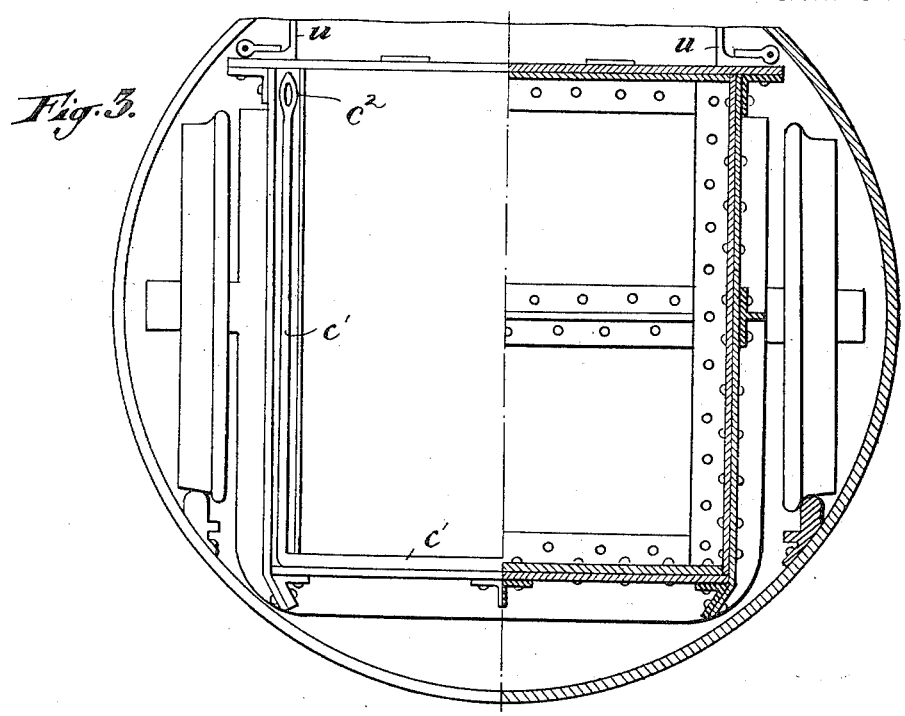
Figure 4:
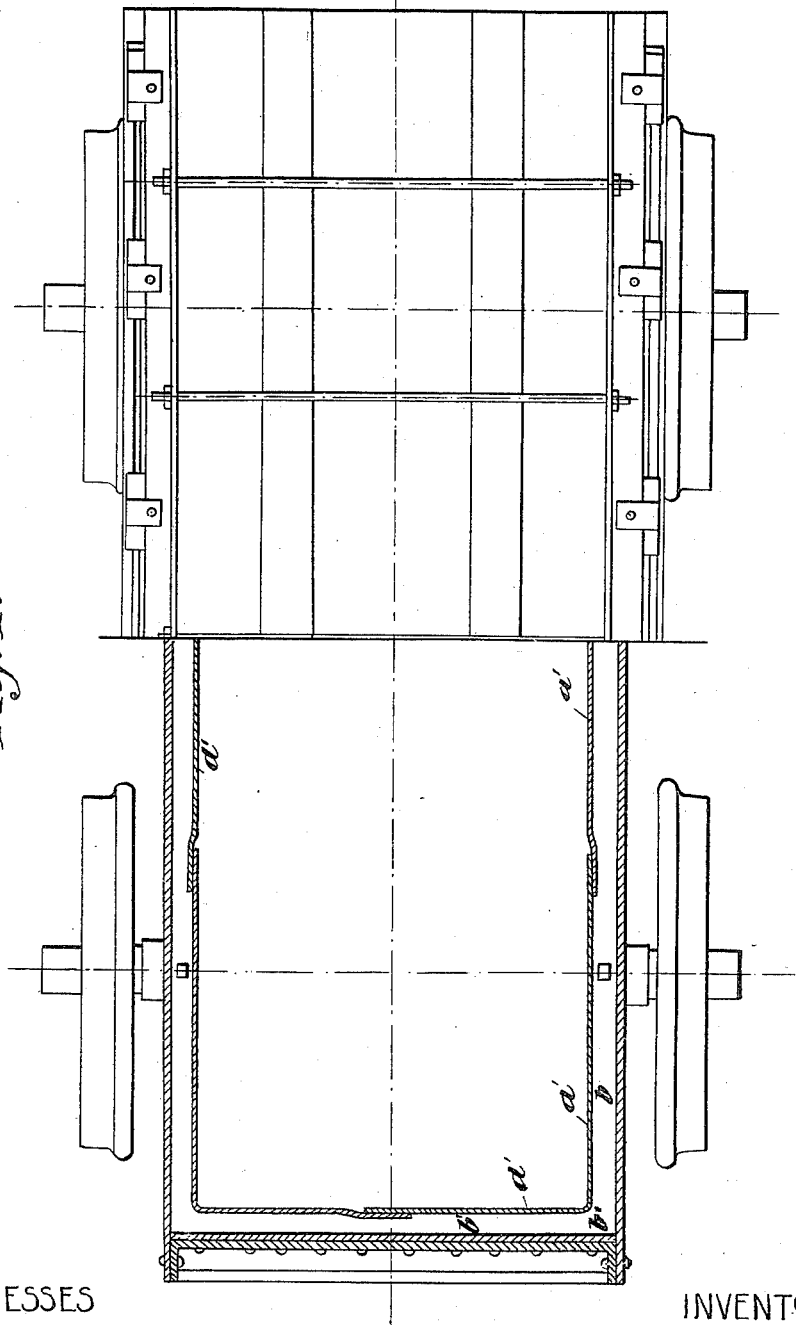

In said drawings, Figure 1 represents a longitudinal sectional view of a furnace with a mold in place therein, said mold being partly shown in section and partly in side elevation. Fig. 2 is an end view of the furnace. Fig. 3 represents a cross-section of the same with a mold in place therein, said mold being partly shown in cross-section and partly in end elevation. Fig. 4 represents a part plan view and part horizontal section of the mold.

In the drawings like letters refer to like parts throughout all the figures.

The molds adapted to receive the above-named mixture of materials are so constructed that they may be used as trucks, which permits of easily running them into the furnace within which the chemical actions are produced. The walls of said molds are movably secured together, the front and back supporting two wheels $l$, which facilitate the entrance of the mold into the furnace by running over rails $d$, arranged within the latter. (See Fig. 1.) The top $z$ of the movable mold is removable and may be secured in place by means of movable angle-irons $u$. (See Figs. 1 and 3.) To allow the compressing action of the heated fluid and also to permit expansion of the block during petrifaction and avoiding its adhesion to the mold, I provide the latter with movable walls $a'$ within the same, the free space $b'$ between said walls being filled with sand and secured by means of brace-plates, as shown in Figs. 3 and 4. Furthermore, the removal of the block is facilitated by means of yoke-irons $c'$, extending around said block and terminating in eyes $c^2$, to which the ends of the chains of a crane may be readily attached. Thus the block may be removed without its being required to take the outer casing apart, the intermediate sand preventing adherence of the block. The said yoke-irons are U-shaped, passing down the outer sides of the movable walls $a'$ and under the bottoms of the stone blocks, their upwardly-presented ends being provided with the eyes $c^2$, as aforesaid, for the attachment of the crane-chains, whereby the blocks are lifted out of the molds. The inner walls $a'$ are necessarily lifted out with the block in each instance, and the lower edges of said walls will prevent the bottom part of the yoke-iron from disfiguring the bottom of the block. Any slight abrasion which may occur will be easily trimmed off afterward.

The boiler $a$, receiving the mold filled with mixture, is mounted and fitted into stonework $w$, Fig. 1, like ordinary steam-boilers, said stonework being provided with flues for the passage of gas and smoke produced at the grate $f$, located beneath the boiler. The latter is provided with all necessary attachments, such as safety-valve $s$, water-gage $n$, and manometer $m$.

The boiler has a removable door for introducing and withdrawing the molds. To this end said door $k$ has outer screw-threads $j^2$, adapted to engage corresponding threads provided in said boiler, said screw-threads being omitted over three-sixths of the peripheries, so as to have alternately-threaded and plain portions. If it is desired to close the boiler, the plain portions of the inner boiler periphery are made to register with the plain portions of the outer periphery, whereupon the door is to be rotated for about one-sixth of a revolution, thus readily effecting the closure. A suitable packing may further be inserted, so as to secure the tightness of the joint. Said door has an electric-current wire $p$ passing through it and insulated therefrom by a suitable part $t'$. Another current-wire $p'$ passes through the upper wall of the boiler and is insulated by means of a suitable part $t$. These two wires are suitably connected with the mold for the purpose above described.

Heretofore, as in my British Patent No. 23,018 of 1895, steam or hot water and electricity have been used for producing artificial stone from the ingredients named, the latter being contained within molds having rigid side walls. These immovable walls obviously prevent the pressure of the steam or hot water from being applied to the sides of the block during petrifaction. The downward pressure of the steam or hot water will in such circumstances be practicable, provided the space above be kept closed; but such pressure will do more harm than good when not counterbalanced by an equal pressure on the sides of the block, since it will exert a crushing force and lessen the cohesion of the particles. My present invention takes the prior state of the art as shown in my said British patent and carries the same process one stage further toward perfection. The means of effecting this are simple. I simply make the side walls of the mold, which are in contact with the block, freely movable. In consequence these walls instead of remaining fixed in position and barring the way of the hot-water pressure to the sides of the block yield freely inward under such pressure, and the latter is therefore applied through said walls to the sides of the block as freely as it is applied above and with equal force and efficiency. Thus to the three elemental actions—heat, electricity, and aqueous moisture—applied by my said British patent I add a fourth—namely, equal and counterbalancing pressure from all sides, as well as from above, which pressure I have described as applied by hot water.

As it is evident that many changes may be made in the construction and arrangement of the above-named apparatus without departing from the scope and spirit of my invention, I would have it understood that I do not restrict myself to the particular construction and arrangement of parts herein shown and described, but that such changes and equivalents may be resorted to.

Having thus fully described my invention, what I claim as new, and desire to secure by Letters Patent, is—

A process of producing artificial stone, which consists in crushing sand and lime to impalpable powder; mixing these materials and submitting the mixture to the action of electricity, the moistening effect of hot water and pressure by the latter equally to the top and to all sides of the block, the lateral inward pressure fully counterbalancing the downward pressure and preventing all disintegrating action while compressing the block, substantially as set forth.

In testimony whereof I affix my signature in presence of two witnesses.

EMERY COULON.

Witnesses:
ED. STURM,
GREGORY PHILON.